US008692496B2

(12) United States Patent
McGrogan et al.

(10) Patent No.: US 8,692,496 B2
(45) Date of Patent: Apr. 8, 2014

(54) METHOD AND APPARATUS FOR INITIALIZING AN ELECTRIC POWER CONTROL SCHEME

(75) Inventors: Sean W. McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 13/161,584

(22) Filed: Jun. 16, 2011

(65) Prior Publication Data
US 2012/0319634 A1 Dec. 20, 2012

(51) Int. Cl.
H02P 7/00 (2006.01)
H02P 7/29 (2006.01)

(52) U.S. Cl.
USPC ............... 318/434; 318/432; 318/140; 477/3; 701/22

(58) Field of Classification Search
USPC ......... 318/430–434, 140–145; 701/22; 477/3; 307/9.1; 180/65.26
See application file for complete search history.

(56) References Cited

U.S. PATENT DOCUMENTS

| | | | | |
|---|---|---|---|---|
| 6,211,681 B1* | 4/2001 | Kagawa et al. | ................. | 324/426 |
| 6,522,148 B2* | 2/2003 | Ochiai et al. | ................... | 324/428 |
| 6,659,213 B2* | 12/2003 | Kubo et al. | ................. | 180/65.26 |
| 7,267,191 B2* | 9/2007 | Xu et al. | ................... | 180/65.245 |
| 7,738,904 B1* | 6/2010 | Chien et al. | ..................... | 455/522 |
| 8,112,192 B2* | 2/2012 | Heap et al. | ....................... | 701/22 |
| 8,287,426 B2* | 10/2012 | Heap et al. | .......................... | 477/3 |
| 2002/0157882 A1* | 10/2002 | Kubo et al. | ................... | 180/65.3 |
| 2002/0171429 A1* | 11/2002 | Ochiai et al. | ................... | 324/426 |
| 2006/0021809 A1* | 2/2006 | Xu et al. | ...................... | 180/65.2 |
| 2009/0118079 A1* | 5/2009 | Heap et al. | ......................... | 477/3 |
| 2009/0118080 A1* | 5/2009 | Heap et al. | ......................... | 477/3 |
| 2009/0309416 A1* | 12/2009 | Bose et al. | ....................... | 307/9.1 |
| 2010/0292880 A1* | 11/2010 | McGrogan et al. | ............. | 701/22 |

OTHER PUBLICATIONS

U.S. Appl. No. 13/029,381, Michael Arnett.
U.S. Appl. No. 13/160,937, Jy-Jen F. Sah.
U.S. Appl. No. 13/160,908, Sean W. McGrogan.
U.S. Appl. No. 13/161,584, Sean W. McGrogan.
U.S. Appl. No. 13/161,602, Jy-Jen F. Sah.
U.S. Appl. No. 13/152,380, Michael Arnett.
U.S. Appl. No. 13/162,720, Ryan D. Martini.
U.S. Appl. No. 13/163,668, Anthony H. Heap.
U.S. Appl. No. 13/163,115, Jy-Jen F. Sah.
U.S. Appl. No. 13/162,767, Sean McGrogan.

* cited by examiner

*Primary Examiner* — Paul Ip

(57) ABSTRACT

A method for controlling an electric power flow between a high-voltage battery and an electrically-powered torque machine of a powertrain system includes, upon violating a constraint associated with the electric power flow during operation of the powertrain system, executing a battery power control scheme for controlling the electric power flow including commanding an initial state for a parameter of the electric power flow, the initial state for the parameter of the electric power flow including a maximum estimated state for the parameter of the electric power flow occurring during one of a plurality of selected ones of previous timesteps.

16 Claims, 3 Drawing Sheets

METHOD AND APPARATUS FOR INITIALIZING AN ELECTRIC POWER CONTROL SCHEME

TECHNICAL FIELD

This disclosure is related to powertrain systems including electric-powered torque machines and electric power control schemes.

BACKGROUND

The statements in this section merely provide background information related to the present disclosure. Accordingly, such statements are not intended to constitute an admission of prior art.

Vehicle systems include powertrain systems that provide tractive torque for propulsion. Powertrain systems may include hybrid systems, all-electric systems, and extended-range electric systems that may be configured to operate in various operating modes to generate and transfer torque to a driveline. Such powertrain systems use torque-generative devices, clutches and transmissions. Torque-generative devices include internal combustion engines and electrically-powered motor/generators, i.e., electric machines. Known electric machines interact with energy storage devices, e.g., high-voltage batteries. Known high-voltage batteries include those fabricated from a plurality of lithium-ion cells. Known energy storage device devices configured to store electric energy on-vehicle include a plurality of high-voltage electrical cells and ultracapacitors, among others.

Known parameters associated with monitoring an energy storage device include a state-of-charge, current, and voltage. Available battery power describes battery power limits that include an allowable range between minimum and maximum allowable battery power levels. Allowable battery power limits are preferably established at threshold levels to prevent either overcharging or overdischarging of an energy storage device. Exceeding allowable battery power limits may result in damage that reduces service life of an energy storage device. It is known that overaggressive limitations in the allowable battery power limits may result in underutilization, with attendant reduction in tractive torque generated using electric power. In hybrid powertrain systems and extended-range electric systems, there may be a corresponding increase in tractive torque generated using an internal combustion engine.

SUMMARY

A method for controlling an electric power flow between a high-voltage battery and an electrically-powered torque machine of a powertrain system includes, upon violating a constraint associated with the electric power flow during operation of the powertrain system, executing a battery power control scheme for controlling the electric power flow including commanding an initial state for a parameter of the electric power flow, the initial state for the parameter of the electric power flow including a maximum estimated state for the parameter of the electric power flow occurring during one of a plurality of selected ones of previous timesteps.

BRIEF DESCRIPTION OF THE DRAWINGS

One or more embodiments will now be described, by way of example, with reference to the accompanying drawings, in which.

DETAILED DESCRIPTION

Figure 1:
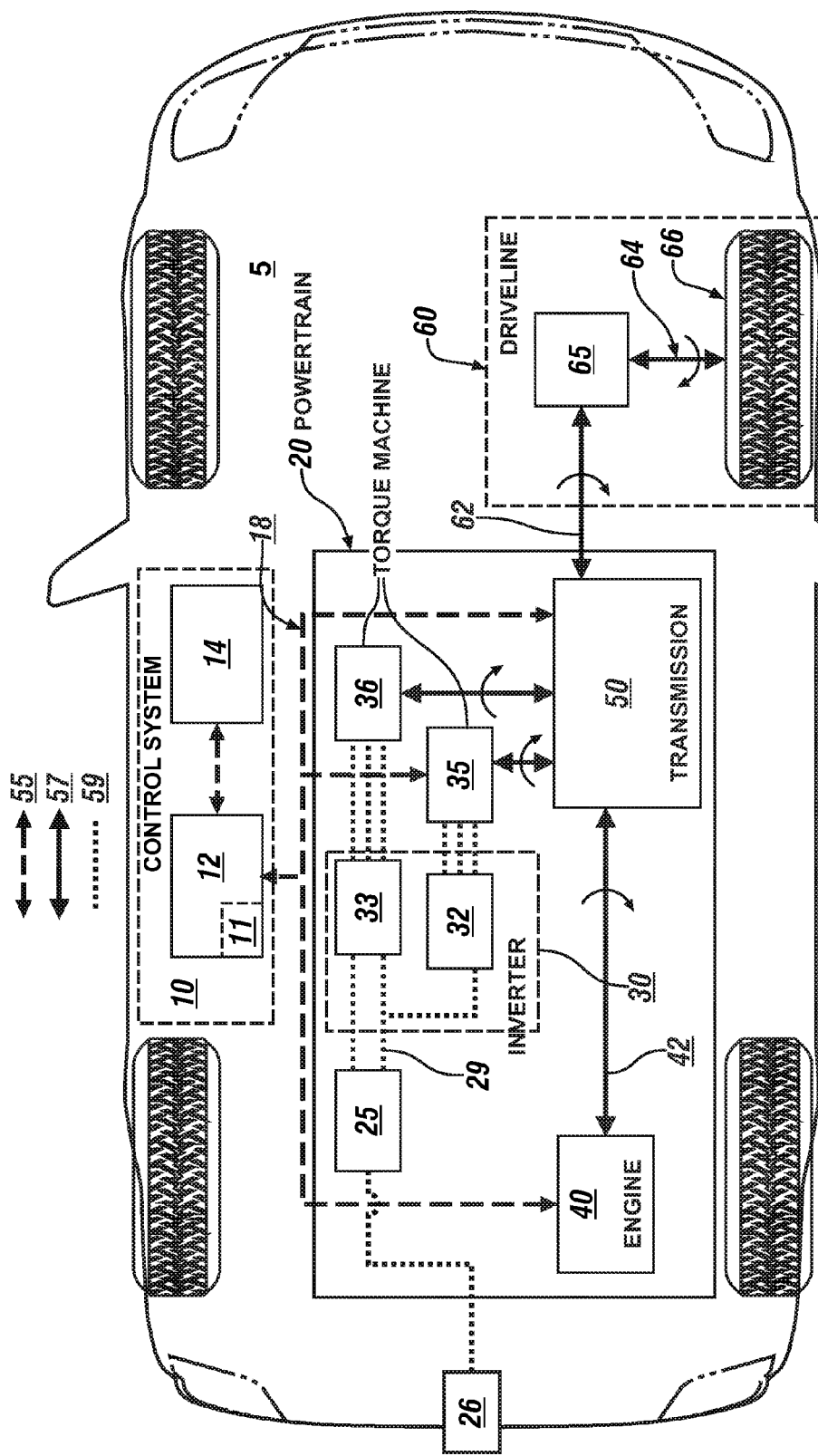
FIG. 1 illustrates an embodiment of a vehicle including a hybrid powertrain system coupled to a driveline and controlled by a control system in accordance with the disclosure.

Referring now to the drawings, wherein the showings are for the purpose of illustrating certain exemplary embodiments only and not for the purpose of limiting the same, FIG. 1 schematically shows vehicle 5 including a powertrain system 20 coupled to a driveline 60 and controlled by a control system 10. Like numerals refer to like elements throughout the description. The powertrain system 20 may be configured as any one of a battery-electric system (EV), an extended-range electric system (EREV), an electric-hybrid system including one of a series-hybrid system, a parallel-hybrid system, and a compound-hybrid system, or another configuration without limitation. The embodiment of the vehicle 5 including the powertrain system 20 is illustrative but not limiting.

The powertrain system 20 employs communications paths 55 (dashed line), mechanical power paths 57 (solid line), and high-voltage electric power paths 59 (dotted line). The mechanical power paths 57 mechanically couple elements that generate, use, and/or transfer torque, including such elements as an internal combustion engine 40, first and second electrically-powered torque machines 35 and 36, respectively, a transmission 50, and a driveline 60. The high-voltage electric power paths 59 electrically connect elements that generate, use, and/or transfer high-voltage electric power, including such elements as an energy storage device 25, an inverter module 30, and the first and second electrically-powered torque machines 35 and 36. The high-voltage electric power paths 59 include a high-voltage DC bus 29.

The communications path 55 may include direct data transfer lines and high-speed data transfer lines to effect communications within the control system 10 and effect communications between the control system 10 and elements of the vehicle 5. The communications path 55 may include one or more of a direct analog connection, a digital connection, a serial peripheral interface (SPI) bus, and a high-speed communications bus 18 that may include a controller area network, i.e., a CAN bus.

The engine 40 is preferably a multi-cylinder direct fuel injection internal combustion engine that converts fuel to mechanical power through a combustion process. The engine 40 is equipped with a plurality of sensing devices and actuators configured to monitor operation and deliver fuel to form a combustion charge to generate torque. In one embodiment, the engine 40 is configured to operate as a spark-ignition engine with timing of combustion and the associated engine torque being controlled by advancing or retarding spark ignition timing. In one embodiment the engine 40 is configured as a spark-ignition direct-injection (SIDI) engine that operates in either a spark-ignition combustion mode or a controlled auto-ignition (HCCI) combustion mode. Alternatively, the engine 40 is configured to operate as a compression-ignition engine with timing of combustion and the associated engine torque controlled by advancing or retarding timing of fuel injection events. The engine 40 is configured to execute autostart and autostop control schemes and fuel cutoff (FCO) control schemes during ongoing operation of the vehicle system 5. By way of definition, the engine 40 is considered to be in an OFF state when it is not being fueled and is not spinning. The engine 40 is considered to be in an FCO state when it is spinning but is not being fueled.

The first and second torque machines 35 and 36 preferably include multi-phase electric motor/generators electrically connected to the inverter module 30 that are configured to convert stored electric energy to mechanical power and convert mechanical power to electric energy that may be stored in the energy storage device 25. The first and second torque machines 35 and 36 have limitations in power outputs in the form of torque and rotational speeds.

The inverter module 30 includes first and second inverters 32 and 33 that electrically connect to the first and second torque machines 35 and 36, respectively. The first and second torque machines 35 and 36 interact with the respective first and second inverters 32 and 33 to convert stored electric energy to mechanical power and convert mechanical power to electric energy that may be stored in the energy storage device 25. The first and second electric power inverters 32 and 33 are operative to transform high voltage DC electric power to high-voltage AC electric power and also operative to transform high voltage AC electric power to high-voltage DC electric power. Electric power originating in the first torque machine 35 may be transferred electrically to the energy storage device 25 via the inverter module 30 and the high-voltage bus 29 and to the second torque machine 36 via the inverter module 30. Electric power originating in the second torque machine 36 may be transferred electrically to the energy storage device 25 via the inverter module 30 and the high-voltage bus 29 and to the first torque machine 35 via the inverter module 30 and the high-voltage bus 29. Monitored electric power associated with the energy storage device 25, the inverter module 30 and the high-voltage bus 29 include current (Ibat) and voltage (Vbat). Monitored outputs from the first and second torque machines 35 and 36 include torques (Ta and Tb, respectively), and rotational speeds (Na and Nb, respectively).

The transmission 50 preferably includes one or more differential gear sets and activatable clutch components to effect torque transfer between the engine 40, the first and second torque machines 35 and 36, and an output member 62 that couples to the driveline 60. In one embodiment the transmission 50 is a two-mode transmission device configured to operate in conjunction with the first and second torque machines 35 and 36 to transfer torque in one of two or more distinct gear trains referred to as Mode 1 and Mode 2 in one embodiment. The two or more distinct gear trains referred to as Mode 1 and Mode 2 may include either or both fixed gear operation and continuously variable operation.

The driveline 60 may include a differential gear device 65 that mechanically couples to an axle 64 or half-shaft that mechanically couples to a wheel 66 in one embodiment. The differential gear device 65 is coupled to the output member 62 of the hybrid powertrain system 20, and transfers output power therebetween. The driveline 60 transfers tractive power between the transmission 50 and a road surface.

Mechanical power originating in the engine 40 may be transferred via an input member 42 to the first torque machine 35 and to the output member 62 via the transmission 50. Mechanical power originating in the first torque machine 35 may be transferred to the engine 40 via the transmission 50 and the input member 42, and may be transferred to the output member 62 via the transmission 50. Mechanical power originating in the second torque machine 36 may be transferred via the transmission 50 to the output member 62. Mechanical power may be transferred between the transmission 50 and the driveline 60 via the output member 62. Operating parameters associated with mechanical power transfer include power between the engine 40 via the transmission 50 indicated by input torque Ti and input speed Ni, and power between the transmission 50 and the driveline 60 indicated by tractive torque To and output speed No.

The energy storage device 25 may be any energy storage device, e.g., a high-voltage battery. One exemplary energy storage device 25 is a high-voltage battery fabricated from a plurality of lithium-ion cells. It is appreciated that the energy storage device 25 may include a plurality of electrical cells, ultracapacitors, and other electrochemical devices configured to store energy and provide electric energy on-vehicle. When the energy storage device 25 is a high-voltage battery, it is electrically connected via the high-voltage bus 29 to the inverter module 30 that connects to the first and second torque machines 35 and 36 to transfer electric power therebetween. In one embodiment, an external connector 26 electrically connects to the high-voltage battery 25 and is connectable to an external AC power source to provide electric power for charging the high-voltage battery 25.

Parameters associated with the energy storage device 25 include a state-of-charge (SOC), temperature, available voltage, and available battery power, each of which is monitored by the control system 10. The available battery power represents battery limits that include an allowable range between maximum and minimum allowable battery powers, described as a maximum battery power (Pbat_max) and a minimum battery power (Pbat_min), respectively. It is appreciated that the battery power is measured in terms of parameters that may be regularly monitored, including e.g., battery current and battery voltage, and may be measured in kilowatts (kW). The allowable battery power limits are preferably established at threshold levels to prevent either overcharging or overdischarging of the energy storage device 25, which may result in damage that reduces service life thereof.

An electric power management system may be either a charge-depleting system or a charge-sustaining system. The terms charge-depleting system and charge-sustaining system define and indicate an operating strategy for using and managing stored electric power in a vehicle, e.g., an embodiment of the vehicle 5 during a key-on cycle. During a key-on cycle, a charge-depleting system preferentially generates tractive torque exclusively using the torque machines until the SOC of the energy storage device 25 is less than a predetermined threshold, at which time an internal combustion engine is activated to generate torque for either or both tractive torque and electric power generation. During a key-on cycle, a charge-sustaining system generates tractive torque using both the engine and the torque machines, with the intent of maintaining the SOC of the energy storage device 25 within a predetermined range during the entire key-on cycle, and with the intent that the SOC at the end of the key-on cycle is substantially the same as the SOC at the beginning of the key-on cycle. Magnitudes of threshold states described herein are determined and correspond to whether the electric power management system is a charge-depleting system or a charge-sustaining system.

The control system 10 includes a control module 12 that signally connects to an operator interface 14. The operator interface 14 is used to collectively indicate a plurality of human/machine interface devices through which the vehicle operator commands operation of the vehicle 5. It is appreciated that human/machine interface devices may include, e.g., an ignition switch to enable an operator to crank and start the engine 40, an accelerator pedal, a brake pedal, and a transmission range selector, i.e., PRNDL. Vehicle operator commands include an operator torque request (To), which indicates an operator request for a magnitude of tractive torque delivered to the driveline 60 to effect vehicle acceleration. It is appreciated that vehicle acceleration includes positive and negative acceleration events.

The control module 12 signally connects to sensing devices of each of the energy storage device 25, the inverter module 30, the first and second torque machines 35 and 36, the engine 40, and the transmission 50. The control module 12 operatively connects to actuators of the inverter module 30 including the first and second inverters 32 and 33, the engine 40, and the transmission 50 either directly or via the communications bus 18 to control operation thereof in accordance with executed control schemes that are stored in the form of software routines and calibrations.

The control module 12 is illustrated as a single, unitary element for ease of depiction. The control module 12 preferably has a distributed architecture including a plurality of control module devices. The functions described as being performed by the control module 12 may be combined into one or more devices, e.g., implemented in software, hardware, and/or application-specific integrated circuitry (ASIC) and ancillary circuits that are separate and distinct from the control module 12. Control module, module, control, controller, control unit, processor and similar terms mean any one or various combinations of one or more of ASIC, electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Preferably, a master control module oversees and directs operations of individual control modules of the distributed architecture that are associated with the individual control module devices. The individual control modules may be assigned to and may be physically located near one of the energy storage device 25, the inverter module 30, the first and second torque machines 35 and 36, the engine 40, and the transmission 50 to monitor and control operation thereof. As such, individual control module devices of the control module 12 may directly signally connect to individual sensing devices and directly operatively connect to individual actuators, including the energy storage device 25, the inverter module 30, the first and second torque machines 35 and 36, the engine 40, and the transmission 50 to monitor and control operation thereof.

Communications between the master control module device and individual control module devices of the control module 12, and between the individual control module devices and individual ones of the energy storage device 25, the inverter module 30, the first and second torque machines 35 and 36, the engine 40, and the transmission 50 are accomplished using the communications paths 55 including the communications bus 18. Communicated messages may be in the form of sensor signals and actuator commands using communications protocols associated with the specific elements of the communications path 55, e.g., serial communications. The communications protocols for the high-speed communications bus 18 preferably includes executing communications in a structured manner by periodically sending messages, e.g., on a 12.5 ms loop cycle.

It is appreciated that a control system has latencies between a sensed event and a corresponding response. The latencies may be related to and include sensor response times, sensor signal processing (e.g. A/D conversion, debounce, etc.), communications protocols for messages including sensor signals, controller analysis including actuator response determination, communication protocols for messages including actuator responses, and protocols associated with executing an actuator command. Latencies include those introduced due to the distributed architecture of the control module 12. It is appreciated that any total latency between a sensed event and a corresponding response may be predictable because the aforementioned latencies are measurable and predictable. One latency of interest herein is a latency between a commanded torque output from one of the first and second electrically-powered torque machines 35 and 36 and a corresponding change in the electric power flow from the high-voltage energy storage device 25.

Monitored parameters of the engine 40 preferably include engine speed, engine torque or load, and temperature, including the input torque Ti and input speed Ni. Monitored parameters of the transmission 50 preferably include rotational speeds, including the tractive torque To and output speed No, and hydraulic pressure at a plurality of locations, from which parameters including application of specific torque transfer clutches may be determined Monitored parameters of the first and second torque machines 35 and 36 preferably include rotational speeds and power flows, e.g., electric current flow, from which motor torques may be determined Monitored parameters of the energy storage device 25 may include battery current and voltage (power), state-of-charge, and battery temperature in one embodiment. The monitored parameters may be measured directly, inferred from direct measurements, or otherwise estimated.

Figure 2:
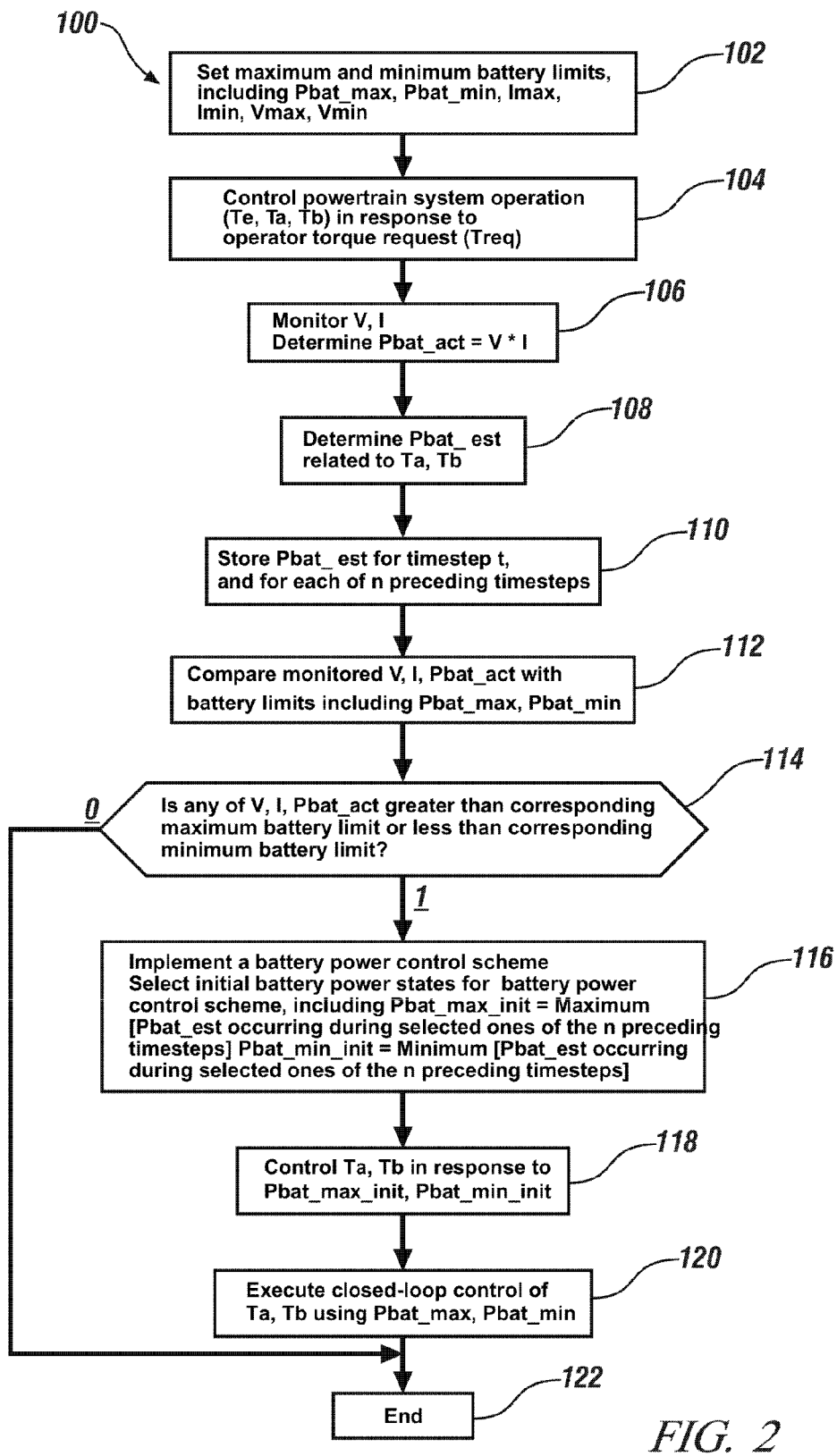
FIG. 2 illustrates a control flowchart for controlling and managing electric power flow between a high-voltage battery and a powertrain system employing an electrically-powered torque machine in accordance with the disclosure.

FIG. 2 illustrates a control scheme 100 in flowchart form for controlling and managing electric power flow between a high-voltage battery and a powertrain system employing an electrically-powered torque machine. The control scheme 100 is described with reference to the vehicle 5 including the powertrain system 20 controlled by the control system 10 of FIG. 1, but it is appreciated that the vehicle 5 is illustrative of an application, and the concepts described herein may be applied to other powertrain systems employing electrically-powered torque machines having communications latencies.

The control scheme 100 includes an overall process of monitoring various parameters associated with electric power flow to and from the high-voltage energy storage device 25. Upon sensing an occurrence of a violation of a constraint associated with the electric power flow, the control scheme 100 implements a battery power control scheme that includes commanding an initial state for a parameter of the electric power flow that is controlled by the battery power control scheme. The battery power control scheme may be any suitable control scheme for controlling electric power flow from the high-voltage energy storage device 25. The initial state for the parameter of the electric power flow is a maximum state for the parameter of the electric power flow occurring during one of a plurality of previous timesteps, as described herein. The maximum state may correspond to a maximum battery power or a minimum battery power, depending upon the present operation of the powertrain system 20. The battery power control scheme uses the initial state for the parameter of the electric power flow as an element of a closed-loop control scheme to control the electric power flow between the high-voltage energy storage device 25 and the first and second torque machines 35 and 36. The initial state for the parameter of the electric power flow is selected based upon the predictable, predetermined time delay between the sensed event, i.e., a sensed violation of the constraint associated with the electric power flow, and corresponding control commands that caused the sensed event. The control scheme 100 and elements thereof are iteratively and periodically executed.

Table 1 is provided as a key wherein the numerically labeled blocks and the corresponding functions are set forth as follows.

TABLE 1

| BLOCK | BLOCK CONTENTS |
| --- | --- |
| 102 | Set maximum and minimum battery limits, including Pbat__max, Pbat__min, Imax, Imin, Vmax, Vmin |
| 104 | Control powertrain system operation (Te, Ta, Tb) in response to operator torque request (Treq) |
| 106 | Monitor V, I<br>Determine Pbat__act = V * I |
| 108 | Determine Pbat__ est related to Ta, Tb |
| 110 | Store Pbat_est for timestep t, and for each of n preceding timesteps |
| 112 | Compare monitored V, I, Pbat_act with battery limits including Pbat__max, Pbat__min |
| 114 | Is any of V, I, Pbat_act greater than corresponding maximum battery limit or less than corresponding minimum battery limit? |
| 116 | Implement a battery power control scheme<br>Select initial battery power states for battery power control scheme, including<br>Pbat__max__init = Maximum [Pbat__est occurring during selected ones of the n preceding timesteps]<br>Pbat__min__init = Minimum [Pbat__est occurring during selected ones of the n preceding timesteps] |
| 118 | Control Ta, Tb in response to Pbat__max__init, Pbat__min__init |
| 120 | Execute closed-loop control of Ta, Tb using Pbat__max, Pbat__min |
| 122 | End |

Overall maximum and minimum limits for the energy storage device 25 are established to protect the integrity of the energy storage device 25 and prevent excessive current flow and battery power levels that may reduce the service life thereof (102). The maximum and minimum limits for the energy storage device 25 preferably include maximum and minimum levels for battery power (Pbat_max, Pbat_min), maximum and minimum levels for current (Imax, Imin), and maximum and minimum levels for voltage (Vmax, Vmin). By way of definition, maximum levels for battery power and current are associated with electrical discharging, and minimum levels for battery power and current are associated with electrical charging.

Operation of the powertrain system 20 is controlled to generate a torque output in response to the operator torque request (Treq) (104). The control module 12 executes control schemes to control operation of the engine 40 in coordination with the first and second torque machines 35 and 36 to manage transfer of mechanical power to the driveline 60 in response to the operator torque request (Treq) concurrent with controlling operation of the inverter module 30 to manage electric power flow. Controlling operation of the engine 40 in coordination with the first and second torque machines 35 and 36 includes commanding an engine torque (Te) in coordination with commanding torque outputs from the first and second torque machines 35 and 36 (Ta and Tb, respectively). Such control schemes include balancing operation of the engine 40 with the maximum and minimum limits for the energy storage device 25. This includes controlling operation of the engine 40 to achieve a preferred engine speed/load operating point that achieves a peak or otherwise preferred efficiency and controlling power flow between the energy storage device 25 and the first and second torque machines 35 and 36 to avoid violating battery limits.

One control scheme that illustrates coordinating torque outputs from the engine 40 in coordination with the first and second torque machines 35 and 36 includes using the following relationship when operating in a fixed gear operating state:

$$[Ta \quad Tb \quad Te] * \begin{bmatrix} A1 \\ A2 \\ A3 \end{bmatrix} = To \qquad [1]$$

wherein
To is the delivered output torque,
Ta is the commanded torque output from the first torque machine 35,
Tb is the commanded torque output from the second torque machine 36,
Te is the torque output from the engine 40, and
A1, A2, and A3 are scalar values.

The control scheme executes to balance the respective torque outputs such that the torque outputs Ta and Tb do not violate the maximum and minimum limits for the energy storage device 25 when the delivered output torque (To) matches the operator torque request (Treq). The available battery power includes the maximum battery power (Pbat_max) and the minimum battery power (Pbat_min).

Electric power parameters including actual voltage (V) on the high-voltage bus 29 and actual current flow (I) to the inverter module 30 are monitored, from which an actual battery power (Pbat_act) is determined (106):

$$P\text{bat\_act} = V*I \qquad [2]$$

An estimated battery power (Pbat_est) is determined (108). The estimated battery power may be estimated from the commanded torque outputs of the first and second electrically-powered torque machines 35 and 36 (Ta, Tb), preferably using a pre-established correlation between the motor torques and electric power in the inverter module 30. It is appreciated that the commanded torque outputs of the first and second electrically-powered torque machines 35 and 36 (Ta, Tb) may not be equivalent to the corresponding achieved torque outputs due to system latencies and other factors.

The estimated battery power (Pbat_est) is stored for each timestep t, with the timestep t corresponding to a periodic execution of control routines used to determine the commanded torque outputs of the first and second electrically-powered torque machines 35 and 36 (Ta, Tb), which may occur at intervals of 5 ms, 6.25 ms, 12.5 ms, or another suitable interval period (110). The estimated battery power (Pbat_est) is stored for each of n preceding timesteps, with the quantity of n steps determined by and associated with the latencies in the system.

The monitored states of the electric power parameters including the actual voltage (V), actual current flow (I), and the actual battery power (Pbat_act) are compared with the battery limits including corresponding maximum and minimum voltage levels, corresponding maximum and minimum current levels, and the maximum battery power (Pbat_max) and the minimum battery power (Pbat_min) (112).

It is determined whether any of the monitored states including the actual voltage (V), actual current flow (I), and the actual battery power (Pbat_act) exceeds the corresponding voltage, current and battery limits (114). If not (0), the present iteration ends (122).

When one or more of the monitored states of the electric power parameters including the actual voltage (V), actual current flow (I), and the actual battery power (Pbat_act) exceeds the corresponding voltage, current and battery limits (1), the control scheme implements a battery power control scheme. The initial battery power states for use with the battery power control scheme are selected as described herein (116).

The initial battery power states include an initial minimum battery power state (Pbat_min_init) and an initial maximum battery power state (Pbat_max_init). Either the initial minimum battery power state (Pbat_min_init) or the initial maximum battery power state (Pbat_max_init) is selected, depending upon whether the energy storage device 25 is charging or discharging.

Selecting the initial battery power state for the battery power control scheme preferably includes reviewing the stored estimated battery power states (Pbat_est) for selected ones of the n preceding timesteps. As previously described, the initial battery power state is selected based upon the predictable, predetermined time delay between the sensed event, i.e., a sensed violation of the constraint associated with the electric power flow, and the corresponding control commands that caused the sensed event. The selection of the selected ones of the n preceding timesteps preferably accounts for the latencies of the control system, as described herein. Thus, in one embodiment the selected ones of the n preceding timesteps includes timesteps of 50 ms, 62.5 ms, and 75 ms preceding the present timestep, and the initial battery power state is the maximum of the stored estimated battery power states (Pbat_est) occurring at the preceding timesteps of 50 ms, 62.5 ms, and 75 ms.

The commanded torque outputs from the first and second torque machines 35 and 36 (Ta and Tb) are determined in relation to the selected one of the initial minimum battery power state (Pbat_min_init) and the maximum battery power state (Pbat_max_init) (118).

A closed-loop control scheme is executed to adjust the commanded torque outputs from the first and second torque machines 35 and 36 responsive to the operator torque request and in relation to the selected one of the initial minimum battery power state (Pbat_min_init) and the initial maximum battery power state (Pbat_max_init). The closed-loop control scheme preferably takes into account present monitored states of the electric power parameters as updated during ongoing operation (120).

Figure 3:
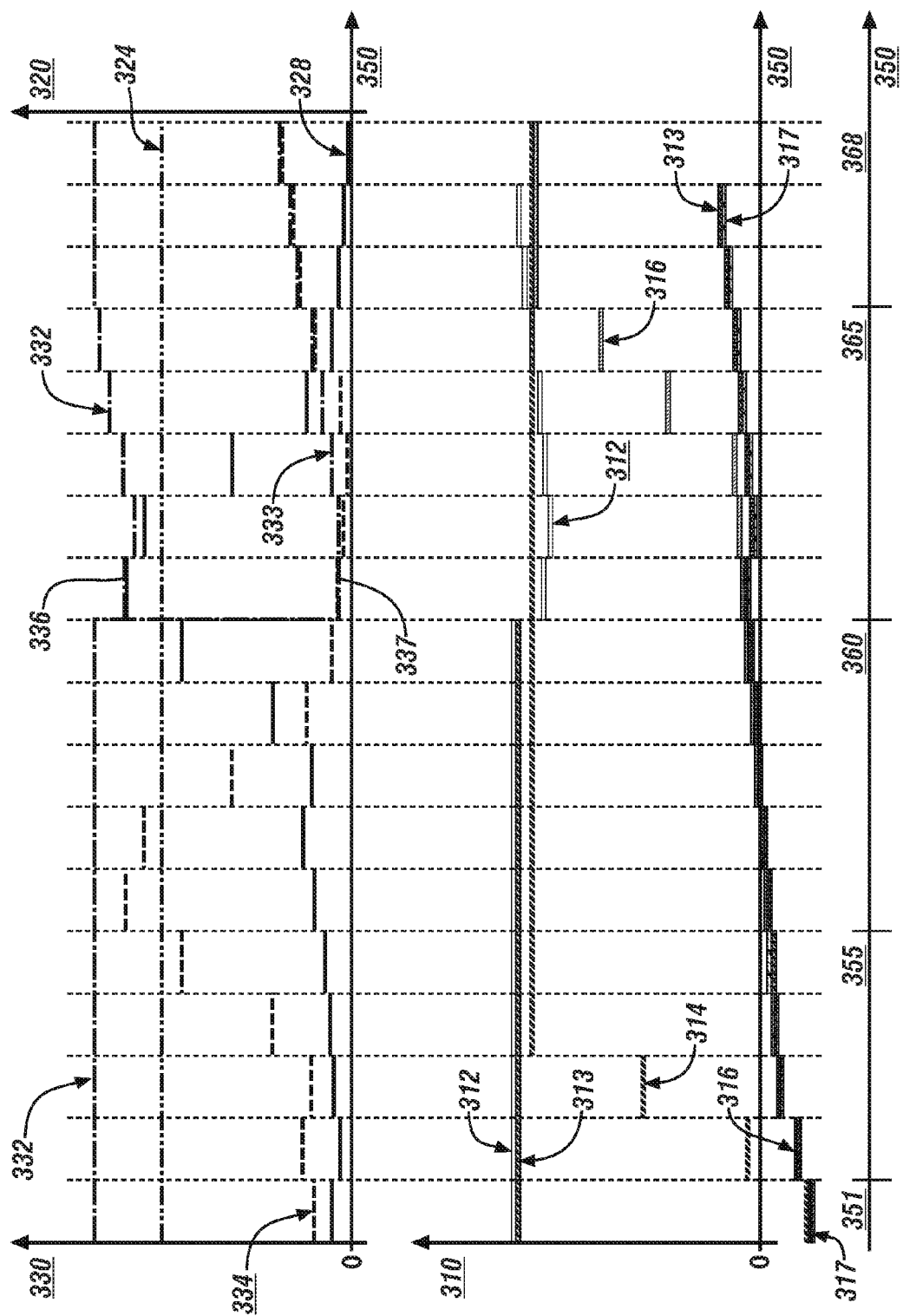
FIG. 3 illustrates battery power, current, and torque, and is associated with controlling and managing electric power flow between a high-voltage battery and a powertrain system employing an electrically-powered torque machine described with reference to FIG. 1 using the control scheme described with reference to FIG. 2 in accordance with the disclosure.

FIG. 3 graphically shows an upper graph including battery power (kW) 330 and current (A) 320 on the vertical axes in relation to elapsed time 350 shown on the horizontal axis, and a lower graph including torque (Nm) 310 on the vertical axis in relation to the elapsed time 350 on the horizontal axis and corresponding to the upper graph. The elapsed time 350 on the horizontal axis is separated into a plurality of discrete time periods incrementing between 351 and 368. Depicted data is associated with controlling and managing electric power flow in an embodiment of the vehicle 5 and powertrain system 20 employing an electrically-powered torque machine described with reference to FIG. 1 using an embodiment of the control scheme 100 described with reference to FIG. 2. The graphically depicted data is related to a battery discharge event. It is appreciated that there is a corresponding process that relates to a battery charge event.

The depicted data associated with the torque 310 includes an operator torque request 314, a first maximum output torque constraint 312 corresponding to operation of the vehicle 5 using the control scheme 100 described with reference to FIG. 2, and a second maximum output torque constraint 313 corresponding to operation of the vehicle 5 using an alternative system. A first delivered output torque 316 corresponds to operation of the vehicle 5 using the control scheme 100 described with reference to FIG. 2, and a second delivered output torque 317 corresponds to operation of the vehicle 5 using the alternative system.

The depicted data associated with the current 320 includes a current limit 324 and a measured battery current 328, which is related to operation of the vehicle 5.

The depicted data associated with the battery power 330 includes a first upper battery power limit 332 (i.e., Pbat_max) corresponding to operation of the vehicle 5 using the control scheme 100 described with reference to FIG. 2, a second upper battery power limit 333 (i.e., Pbat_max) corresponding to operation of the vehicle 5 using the alternative system, and an estimated battery power (i.e., Pbat_est) 334, which is related to operation of the vehicle 5.

The data is shown in a discretized manner and represents data used by the control system 100 for system control and operation during individual ones of the discrete periods. The data is periodically updated, with an update rate corresponding to the data update rate of the high-speed communications bus 18 and update rate(s) of related routines. In one embodiment, and as depicted, the update rate is 12.5 ms. The data used by the control system 100 for system control and operation may be periodically updated at different update rates. It is appreciated that any total latency between a sensed event and corresponding control commands that caused the sensed event may be predictable, as the aforementioned latencies are measurable and predictable. The latency is at or near 62.5 ms for the depicted data of FIG. 3 associated with controlling and managing electric power flow in the embodiment of the vehicle 5 and powertrain system 20 employing an electrically-powered torque machine described with reference to FIG. 1 using an embodiment of the control scheme 100 described with reference to FIG. 2.

Initially, as shown at timestep 351, the first maximum output torque constraint 312 and the second maximum output torque constraint 313 are the same, and are at maximum values.

As shown, the operator torque request 314 increases from a value that is less than zero to a substantially maximum operator torque request at timestep 353, indicating a wide-open throttle event or a wide-open pedal event, which generates a corresponding request for maximum torque output from the powertrain system 20. When the operator torque request 314 increases as described, there is a likelihood of a torque transition in one or more elements of the powertrain system that may cause gear lash and corresponding driveline clunk, which may be objectionable to a vehicle operator. The control scheme 100 responds to the operator torque request 314, as indicated initially by the estimated battery power 334, which increases and approaches the upper battery power limit 322 during timesteps 354, 355, and 356 before tapering off again. The measured current 328 begins increasing in response to the estimated battery power 334. Such a response may include a powertrain operating circumstance wherein the response by the control scheme 100 includes commanding a transmission shift, e.g., a downshift, which consumes battery power.

At timestep 361, the measured current 328 exceeds the current limit 324. Monitoring the measured current 328 and detecting that the measured current 328 exceeds the current limit 324 is described with reference to the control scheme 100 (step 114). As such, when one of the monitored battery states, i.e., one of the actual voltage (V), actual current flow (I), and the actual battery power (Pbat_act) exceeds the corresponding voltage, current and battery limits, the control scheme 100 implements the aforementioned battery power control scheme to control the battery power and prevent harm thereto. As shown, the actual, i.e., measured current 328 exceeds the current limit 324.

In an alternative control scheme, initial states for the battery power include a maximum initial state for battery power 337 that is equal to the battery power estimate occurring at the previous timestep, i.e., the maximum initial state for the battery power 337 at timestep 361 is set to the battery power occurring at timestep 360 in this example. The corresponding output torque 317 is constrained by the second maximum output torque constraint 313, which is shown to be substantially limited, and does not approach the operator torque request 314 in a timely fashion.

As shown with reference to step 116 of the control scheme 100, the maximum initial battery power state 336 at timestep 361 is preferably selected from the stored estimated battery power states 326. Selecting the maximum and minimum initial states for the battery power control scheme preferably includes reviewing the stored estimated battery power states (Pbat_est) for selected ones of the n preceding timesteps. The selection of the selected ones of the n preceding timesteps preferably accounts for latencies, which is near 62.5 ms in the embodiment depicted. In the embodiment shown, the selected ones of the n preceding timesteps includes timesteps of 50 ms, 62.5 ms, and 75 ms preceding the present timestep 360, i.e., timesteps 357, 356, and 355, respectively. The selected initial state for the battery power control scheme is the maximum of the stored estimated battery power states (Pbat_est) occurring at the preceding timesteps of 50 ms, 62.5 ms, and 75 ms, i.e., at timesteps 357, 356, and 355, respectively. It is appreciated that the selected preceding timesteps of 50 ms, 62.5 ms, and 75 ms are determined based upon the latencies for the specific embodiment, and the selected timesteps correspond to latencies between a commanded torque output from one or both the first and second torque machines 35 and 36 and a corresponding change in the electric power flow from the high-voltage battery 25 for the embodiment described with reference to FIG. 1.

The maximum of the stored estimated battery power states (Pbat_est) occurs at the preceding timestep of 62.5 ms, i.e., at timestep 356, which is selected as the maximum initial battery power state 336 for use in the battery power control scheme. The first maximum output torque constraint 312 and the corresponding first delivered output torque 316 are shown after timestep 361, indicating minimal or no disruption of the output torque 316 with the output torque 316 responding to and achieving the torque request 314 at timestep 366.

Thus, the control scheme 100 may be used to mitigate violations of current and voltage limits by modifying the battery limits, which modifies the commanded battery power while allowing operation of battery power control schemes that protect the battery pack without violating the power limits and without unnecessary restrictions to the output torque.

The selection of the selected ones of the n preceding timesteps accounting for system latencies affords ready determination of which commanded battery power (Pbat_Est) from among the previous n preceding timesteps was responsible for causing observed voltage or current or power to violate its corresponding limit by causally connecting battery power commands to observed events. Thus, the initial states for the battery power control scheme are less aggressive, permitting a torque output that is responsive to the operator torque request without undue limitation associated with eliminating a voltage or current violation.

The depicted data shown in FIG. 3 includes an operator torque request 314 that increases from a negative state, e.g., a coastdown event, to a positive state, e.g., a wide-open throttle event. The first delivered output torque 316 does not directly follow the operator torque request 314, due to rate-limited propulsion torque commands. The torque commands are rate-limited because the propulsion torque crosses through zero torque and there is a need to execute driveline lash management to avoid driveline clunk when the output torque crosses over from negative output torque to positive output torque. The rate limiting stops after the output torque crosses over from negative output torque to positive output torque and quickly increases thereafter.

With reference the powertrain system used to generate to FIG. 3, the total delay associated with the first delivered output torque 316 is in the range of 100 msec when using the control scheme 100 described with reference to FIG. 2, which is likely imperceptible to a vehicle operator. In contrast, the total delay associated with the second delivered output torque 317 is in the range of 1 to 2 seconds when operating the vehicle 5 using the alternative system, and is likely perceived by a vehicle operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a high-voltage battery and an electrically-powered torque machine of a powertrain system, comprising:

sensing occurrence of a violation of a constraint associated with electric power flow between the high-voltage battery and the torque machine during operation of the powertrain system; and operating a controller to execute a closed-loop battery power control scheme for controlling the electric power flow between the high-voltage battery and the electrically-powered torque machine including commanding an initial state for a parameter of the electric power flow as an element of the closed-loop battery power control scheme, the initial state for the parameter of the electric power flow comprising a maximum estimated state for the parameter of the electric power flow occurring during one of a plurality of selected ones of timesteps previous to violating said constraint.

2. The method of claim 1, wherein said selected ones of the previous timesteps correspond to latencies between a commanded torque output from the torque machine and a corresponding change in the electric power flow from the high-voltage battery.

3. The method of claim 1, wherein said constraint associated with the electric power flow during operation of the powertrain system comprises a maximum current.

4. The method of claim 3, wherein said maximum current comprises a maximum discharge current.

5. The method of claim 3, wherein said maximum current comprises a maximum charge current.

6. The method of claim 1, wherein said constraint associated with the electric power flow during operation of the powertrain system comprises a maximum voltage.

7. The method of claim 1, wherein said constraint associated with the electric power flow during operation of the powertrain system comprises a minimum voltage.

8. The method of claim 1, wherein said constraint associated with the electric power flow during operation of the powertrain system comprises a maximum battery power.

9. The method of claim 1, wherein said constraint associated with the electric power flow during operation of the powertrain system comprises a minimum battery power.

10. Method for controlling a high-voltage battery and an electrically-powered torque machine of a powertrain system, comprising:

estimating a respective battery power for each of a plurality of timesteps during ongoing operation;

sensing occurrence of a violation of a constraint associated with the electric power flow between the high-voltage battery and the powertrain system;

selecting a maximum of the estimated respective battery powers occurring during selected ones of the plurality of timesteps previous to said violation of the constraint as an initial battery power state; and operating a controller to execute a closed-loop battery power control scheme to control the electric power flow between the high-voltage battery and the electrically-powered torque machine using the initial battery power state as an element of the closed-loop battery power control scheme.

11. The method of claim 10, wherein estimating each respective battery power comprises estimating battery power corresponding to a monitored torque output from the electrically-powered torque machine for each of the timesteps.

12. The method of claim 10, wherein the selected ones of the plurality of timesteps previous to said violation of the constraint correspond to latencies between a commanded torque output from the torque machine and a corresponding change in the electric power flow.

13. Method for controlling an electric power flow between a high-voltage battery and an electrically-powered torque machine of a powertrain system, comprising:

monitoring the electric power flow between a high-voltage battery and the electric-powered torque machine;

detecting a violating of a constraint in the electric power flow between the high-voltage battery and the electric-powered torque machine; and operating a controller to execute a closed-loop battery power control scheme to control the electric power flow between the high-voltage battery and the electric-powered torque machine including commanding an initial state for the closed-loop battery power control scheme to control the electric power flow equal to a maximum estimated state for the electric power flow between the high-voltage battery and the electric-powered torque machine occurring during one of a plurality of selected ones of previous timesteps, wherein the selected ones of the previous timesteps correspond to latencies between a commanded torque output from the electric-powered torque machine and a corresponding change in the electric power flow between the high-voltage battery and the electric-powered torque machine.

14. The method of claim 13, wherein said violation comprises a violation of a current constraint.

15. The method of claim 13, wherein said violation comprises a violation of a voltage constraint.

16. The method of claim 13, wherein said violation comprises a violation of a battery power constraint.

* * * * *